(12) United States Patent
Carter

(10) Patent No.: US 11,793,184 B1
(45) Date of Patent: Oct. 24, 2023

(54) FISHING ROD HOLDING SYSTEM

(71) Applicant: Darrell E. Carter, Elk Point, SD (US)

(72) Inventor: Darrell E. Carter, Elk Point, SD (US)

( * ) Notice: Subject to any disclaimer, the term of this patent is extended or adjusted under 35 U.S.C. 154(b) by 127 days.

(21) Appl. No.: 17/203,949

(22) Filed: Mar. 17, 2021

(51) Int. Cl.
*A01K 97/10* (2006.01)

(52) U.S. Cl.
CPC .................................. *A01K 97/10* (2013.01)

(58) Field of Classification Search
CPC .............................. A01K 97/08; A01K 97/10
See application file for complete search history.

(56) References Cited

U.S. PATENT DOCUMENTS

| | | | |
|---|---|---|---|
| 2,682,127 A | 6/1954 | Binder | |
| 3,792,829 A | 2/1974 | Fickett | |
| 4,063,704 A | 12/1977 | Rother | |
| 4,198,775 A | 4/1980 | Eisner | |
| 6,357,166 B1 * | 3/2002 | Malmanger | A01K 97/10 |
| | | | 43/21.2 |
| 6,571,507 B2 | 6/2003 | Elford | |
| 7,406,795 B1 | 8/2008 | Follmar | |
| 7,686,276 B1 | 3/2010 | McCauley | |
| 10,906,604 B2 | 2/2021 | Elfenbein | |
| 2006/0260174 A1 | 11/2006 | Crowe | |
| 2008/0155881 A1 * | 7/2008 | Carnevali | A01K 97/10 |
| | | | 43/21.2 |
| 2009/0084019 A1 * | 4/2009 | Carnevali | A01K 97/10 |
| 2010/0242827 A1 * | 9/2010 | Rodriguez | B63B 17/00 |
| | | | 114/343 |

OTHER PUBLICATIONS

RAM ROD Fishing Rod Double Ball Mount; 4 pages; www.rammount.com/part/RAM-117U; download date Apr. 12, 2021.

* cited by examiner

*Primary Examiner* — Joshua J Michener
*Assistant Examiner* — Henry Hooper Mudd
(74) *Attorney, Agent, or Firm* — Jeffrey A. Proehl; Woods, Fuller, Shultz & Smith, PC

(57) ABSTRACT

A fishing rod holder device may include a cradle for cradling a portion of the fishing rod and defining a channel for receiving the portion of the rod, a saddle on the cradle and being configured to engage a portion of the reel of a fishing rod assembly when the rod of the fishing rod assembly is positioned in the cradle, and a rod retaining structure on the cradle and being configured to removably secure the rod of the fishing rod assembly in the cradle. The rod retaining structure may have a blocking condition and a releasing condition. The blocking condition may be characterized by the rod retaining structure blocking movement of a rod out of the channel, and the releasing condition may be characterized by the rod retaining structure permitting movement of the rod out of the channel.

15 Claims, 4 Drawing Sheets

FISHING ROD HOLDING SYSTEM

BACKGROUND

Field

The present disclosure relates to fishing rod supports and more particularly pertains to a new fishing rod holding system which makes removal of the fishing rod from the holder quicker and facilitates the setting of the hook in a striking fish's mouth.

SUMMARY

In one aspect, the present disclosure relates to a fishing rod holder device for holding a fishing rod assembly having a rod and a reel mounted on the rod. The holder device may comprise a cradle for cradling a portion of the fishing rod, and the cradle may be elongated with opposite ends and may define a channel for receiving the portion of the rod. The device may further comprise a saddle on the cradle and being configured to engage a portion of the reel of the fishing rod assembly when the rod of the fishing rod assembly is positioned in the cradle. The device may also comprise a rod retaining structure on the cradle which is configured to removably secure the rod of the fishing rod assembly in the cradle. The rod retaining structure may have a blocking condition and a releasing condition, with the blocking condition being characterized by the rod retaining structure blocking movement of a rod of the fishing rod assembly positioned in the channel out of the channel, and the releasing condition being characterized by the rod retaining structure permitting movement of a rod of the fishing rod assembly positioned in the channel out of the channel.

In another aspect, the disclosure relates to a fishing rod holder apparatus for mounting on a hull of the boat. The apparatus may comprise a base mount device configured to mount on the boat, with the base mount device being elongated with an upper end and a lower end. The base mount device may comprise a lower mount member for mounting on the boat, and the lower mount member may be located toward the lower end of the base mount. The base mount device may further comprise an upper mount member located toward the upper end of the base mount, and a linking member linking the lower and upper mount members together. The linking member may be connected to the lower mount member with a lower joint structure and may be connected to the upper mount member with an upper joint structure. The rod holder apparatus may also comprise a fishing rod holder device mounted on the base mount device for holding a fishing rod assembly having a rod and a reel mounted on the rod. The holder device may comprise a cradle for cradling a portion of the fishing rod, with the cradle being elongated with opposite ends and defining a channel for receiving the portion of the rod. The cradle may be mounted on the upper mount member of the base mount device. The holder apparatus may comprise a saddle on the cradle which is configured to engage a portion of the reel of the fishing rod assembly when the rod of the fishing rod assembly is positioned in the cradle. The holder apparatus may also comprise a rod retaining structure on the cradle which is configured to removably secure the rod of the fishing rod assembly in the cradle. The rod retaining structure may have a blocking condition and a releasing condition. The blocking condition may be characterized by the rod retaining structure blocking movement of a rod of the fishing rod assembly positioned in the channel out of the channel, and the releasing condition being characterized by the rod retaining structure permitting movement of a rod of the fishing rod assembly positioned in the channel out of the channel.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
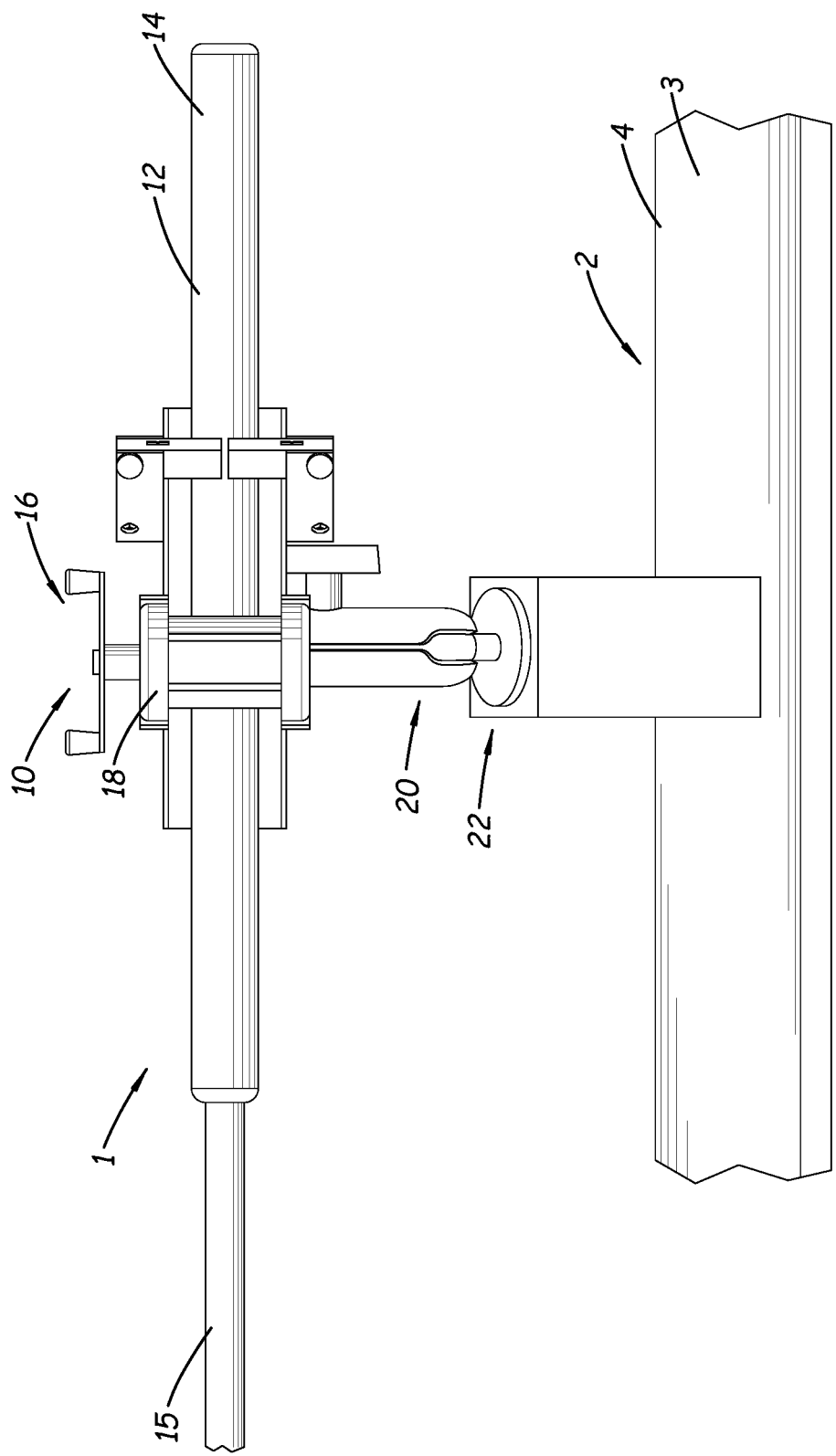
FIG. 1 is a schematic perspective view of a new fishing rod holding system according to the present disclosure.
Figure 2:
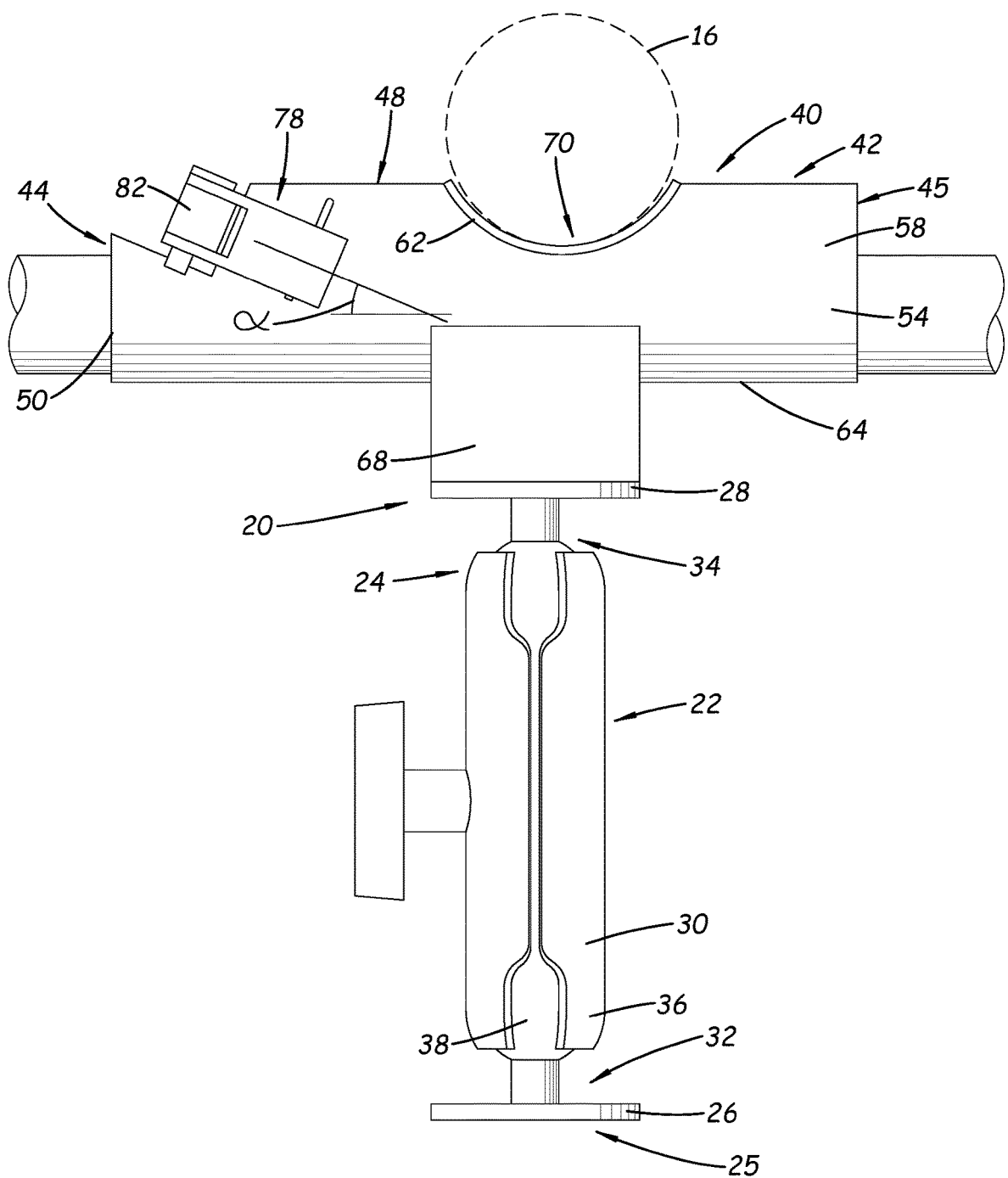
FIG. 2 is a schematic side view of the fishing rod assembly and fishing rod holder apparatus of the system, according to an illustrative embodiment.
Figure 3:
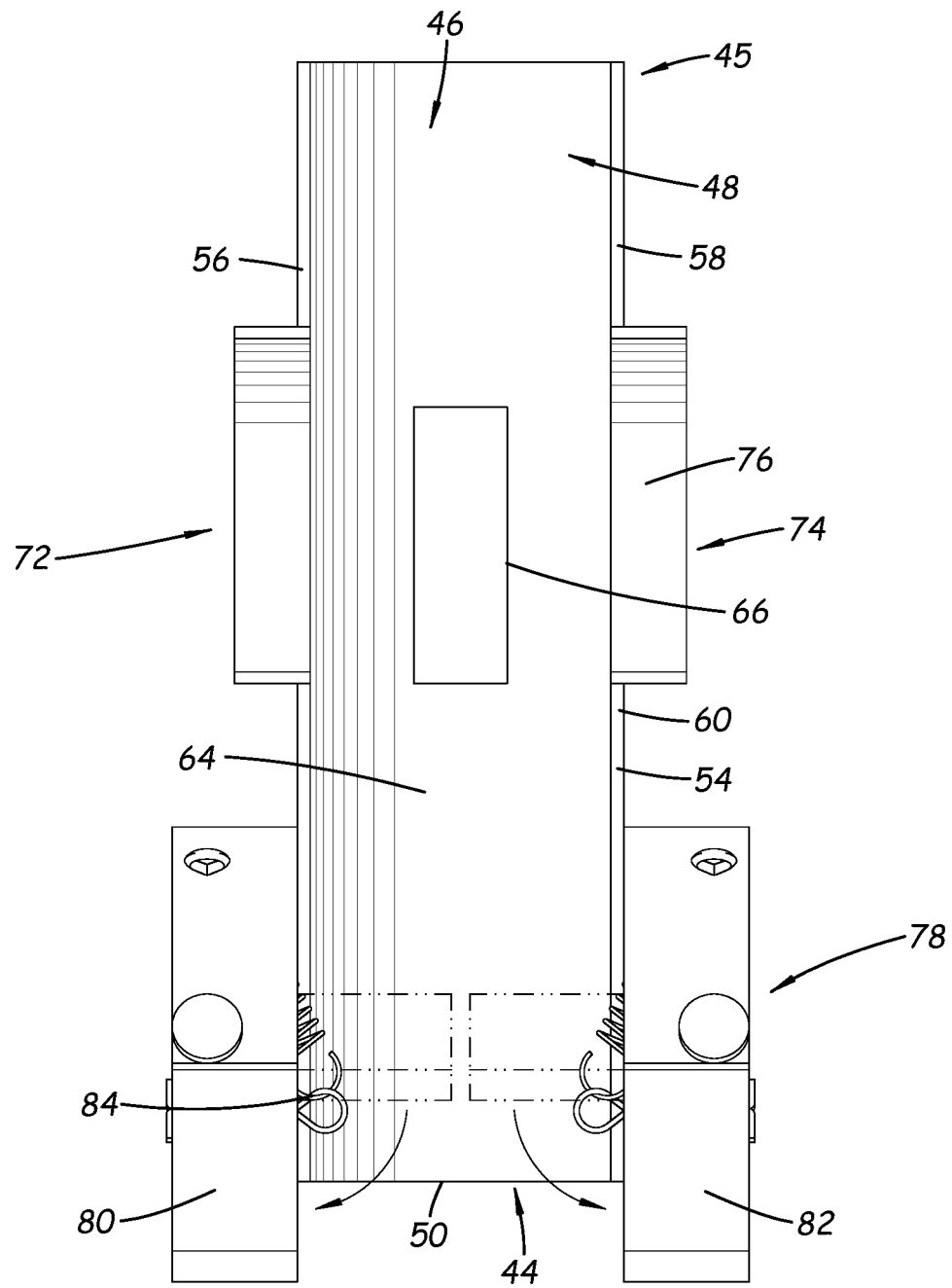
FIG. 3 is a schematic top view of the fishing rod holder apparatus, according to an illustrative embodiment, showing the securing fingers of the rod retaining structure in the blocking position (in broken lines) and in the receiving position (in solid lines).
Figure 4:
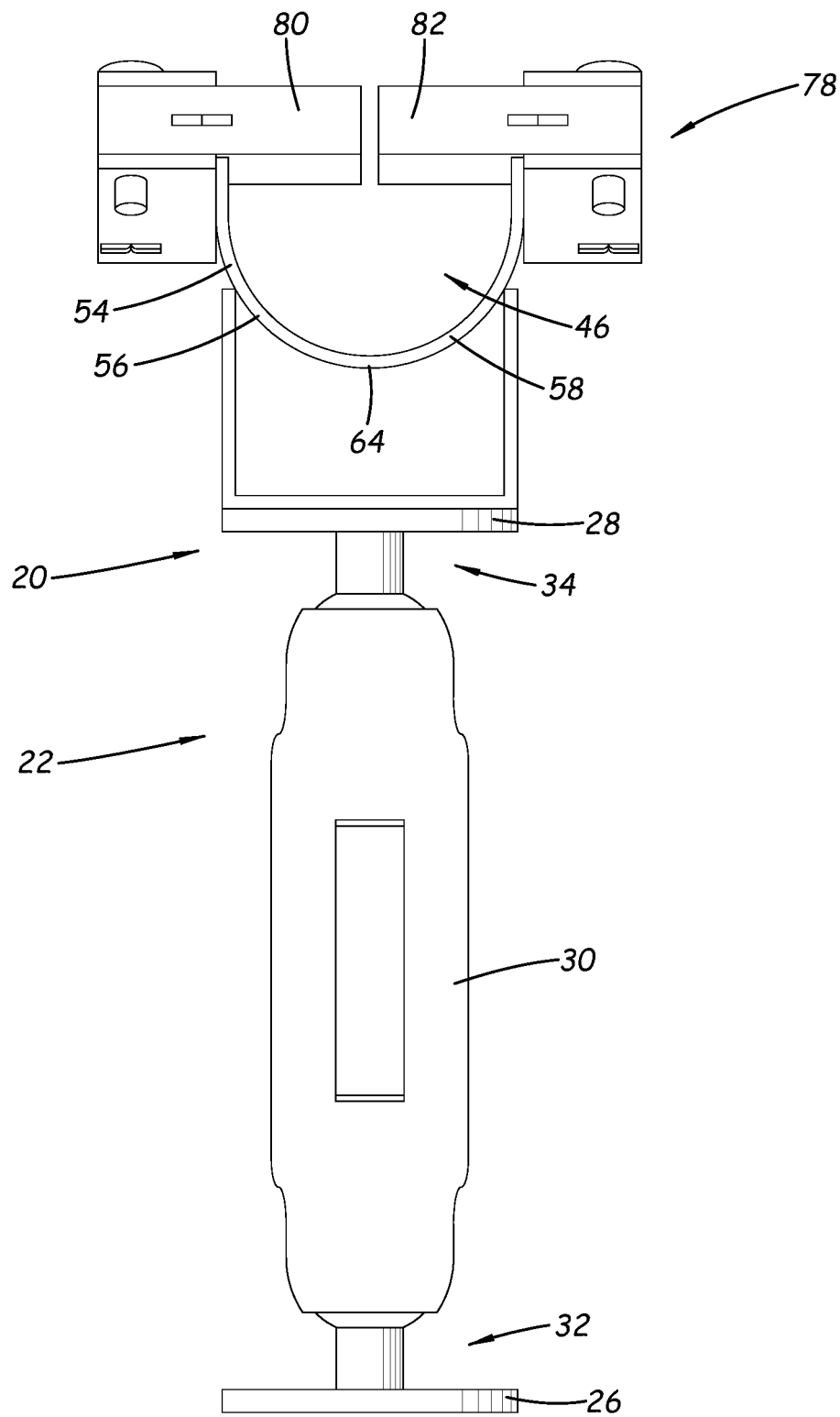
FIG. 4 is a schematic end view of the fishing rod holder apparatus, according to an illustrative embodiment.

With reference now to the drawings, and in particular to FIGS. 1 through 4 thereof, a new fishing rod holding system embodying the principles and concepts of the disclosed subject matter will be described.

The use of fishing rod holders to support a fishing rod assembly on a structure, such as the hull of a boat, is known, and the use of multiple holders to support multiple fishing rod assemblies on the boat hull simultaneously while fishing can provide the greatest degree of "coverage" of the body of water in which the boat is situated.

In such situations, the person fishing will wait until a "hit" on the line of the fishing rod assembly is sensed, and then take hold of the rod assembly, remove the rod assembly from the holder, and attempt to "set" the hook in the mouth of the fish as quickly and as simultaneously as possible. Setting the hook in the model for the fish typically requires moving the fishing rod assembly away from the perceived location of the fish to rapidly increase the tension in the fishing line in a manner that causes the hook on the fishing line to snag on the mouth of the fish before the fish can react to the movement of the hook (such as by moving away from the hook).

However, the applicant has recognized that the known fishing rod holders tend to be less than optimum in these situations, as those rod holders often require a movement or movements of the fishing rod assembly to remove the rod assembly from the holder that complicate, and may be counterproductive to, the setting of the hook in the mouth of the fish. Quite often, removal of the fishing rod assembly from conventional rod holders requires movement of the rod assembly toward or in the direction of the fish, and away from the user of the fishing rod assembly, which can produce slack in the fishing line that allows the fish to avoid becoming snagged on the hook.

The applicant has developed a fishing rod holder device, which may optionally be utilized in a larger fishing rod assembly and system, which greatly improves upon the known fishing rod holders by, for example, diminishing, if not eliminating, the need to make any movement of the fishing rod assembly toward the fish when the user is attempting to simultaneously remove the fishing rod assembly from the fishing rod holder device and set the hook in the mouth of the fish. For example, the user may be able to dismount the fishing rod assembly from the holder device without having to move the rod assembly forwardly, or in a direction towards the tip of the rod, as such a movement can make it more difficult to set the hook on a fish after a strike on the hook. Instead, the user may be able to dismount the fishing rod assembly from the holder device while moving the rod assembly rearwardly, i.e., in the direction towards the handle of the rod, or at least in a direction lateral or transverse to the length of the rod. Notably, forward movement of the rod tends to create slack in the fishing line of the fishing rod assembly which can be counterproductive to the task of setting the hook on the fish, and therefore providing a rod holder device that does not require forward rod movement while dismounting the fishing rod is advantageous.

In some applications, the fishing rod holder device may be laterally tilted away from the direction that the fishing line of the fishing rod assembly is expected to drift (see, e.g., FIG. 1), and this tilt of the holder device may permit removal of the fishing rod assembly from the holder device in a direction of movement that is completely opposite of the direction in which the fishing line extends, further enhancing the ability of the user to move the fishing rod (and connected hook) in a direction that moves the rod and reel away from the extension of the fishing line without any unnecessary movements of the rod and reel in the direction of the fishing line (and toward the hook and striking fish).

In a broad sense, the disclosure relates to a system 1 which may include a boat 2 having a hull 3 with an upper perimeter edge 4 of the hull. In some embodiments, the system 1 may also encompass a fishing rod assembly 10 for use in catching fish from a body of water. The fishing rod assembly 10 may include a fishing rod 12 which is elongated with a handle end 14 and a tip end 15 at a location opposite of the handle end. The fishing rod assembly 10 may further include a reel 16 mounted on the rod, and the reel may be configured to dispense and retract fishing line with respect to the rod 12. Typically, a fish hook is located at the free end of the fishing line, opposite of the portions of the fishing line positioned on the reel 16. Illustratively, the reel 16 may include a reel housing 18 which may close at least a portion of the reel fishing line.

The disclosure may also relate to a fishing rod holder apparatus 20, either in combination with other elements of the system 1 or independently of those elements. The fishing rod holder apparatus 20 may be mountable on the hull 3 of the boat 2 for use. In greater detail, the rod holder apparatus 20 may include a base mount device 22 for mounting on the boat 2, and typically on the upper perimeter edge 4 of the home 3. Illustratively, the base mount device 22 may be elongated with an upper end 24 and a lower end 25, and the lower end 25 is typically mounted on the perimeter edge 4 of the hull and mount device 22 generally extends upwardly or outwardly from the edge 4 so that the upper end 24 is located upwardly and/or outwardly from the edge 4.

The base mount device 22 may include a lower mount member 26 for mounting on a supporting structure, such as the upper perimeter edge 4 of the boat, and the lower mount member 26 may be located toward the lower end 25 of the base mount 22. The base mount device 22 may further include an upper mount member 28 located toward the upper end 24 of the base mount 22. The base mount device 22 may also include a linking member 30 which links the lower 26 and upper 28 mount members together. The linking member 30 may be connected to the lower mount member 26 with a lower joint structure 32, and may be connected to the upper mount member 28 with an upper joint structure 34. In some embodiments, the joint structure may permit free rotation of one element with respect to the other element, while preventing translation of the elements with respect to each other in any direction. In the illustrative embodiments, each of the joint structures may comprise a ball and socket joint structure. For example, a socket 36 of the respective ball joint structure may be mounted on the linking member 30 and a ball 38 of the ball joint structure may be mounted on a respective one of the mount members.

The disclosure will further relate to a fishing rod holder device 40 for holding the fishing rod assembly 10, and the rod holder device 40 may be utilized with, or independent of, other elements of the system including the fishing rod holder apparatus 20. The rod holder device 40 may include a cradle 42 for cradling a portion of the fishing rod, such as a portion of the rod close to and sometimes including the handle end 14 of the rod 12.

In general, the cradle 42 may be elongated with opposite ends 44, 45, including an inboard end 44 and an outboard end 45. The inboard end 44 may be oriented toward the user (or toward the interior of the boat) and the outboard end may be oriented away from the user (or away from the interior of the boat). The cradle 42 may define a channel 46 for receiving the portion of the rod, and the cradle may have a channel top opening 48 to permit the rod portion to be moved through the channel top opening into the channel 46, as well as of the channel. The channel 46 may have channel end openings 50, 52 located at respective opposite ends of the cradle 42 such that portions of the rod are able to extend through the ends 44, 45 and outwardly from the ends of the cradle. The channel end openings may include an inboard end opening 50 and an outboard end opening 52.

The cradle 42 of the rod holder device 40 may comprise a cradle wall 54 which forms the channel 46 of the cradle, and in some implementations, the cradle wall 54 may be substantially semi-cylindrical in shape. The cradle wall 54 may comprise a pair of side wall portions 56, 58 which are positioned on opposite sides of the channel 46, and the side wall portions may extend between the opposite ends 44, 45 of the cradle. Each of the side wall portions 56, 58 may have an upper edge 60. The upper edges 60 of the side wall portions may be oriented substantially parallel to each other, and may define an edge plane. A major portion of the side wall portions 56, 58 may be oriented substantially perpendicular to the edge plane. A saddle section 62 of each of the upper edges 60 may be semi-circular in shape. The cradle 54 may also comprise a bottom wall portion 64 that extends between the side wall portions 56, 58 and also between the opposite ends 44, 45 of the cradle. The bottom wall portion 64 may be substantially semi-cylindrical in shape to provide greater engagement with substantially cylindrical outer surface of the rod 12 when the rod is located in the cradle. Optionally, an opening 66 may be located in the bottom wall portion 64 to accept or accommodate protrusions present on some types of rods 12.

The cradle 42 may further include a cradle bracket 68 which is attached to the cradle wall 54, such as at a location opposite of the channel top opening 48. The upper mount member 28 of the fishing rod holder apparatus 20 may be mounted on the cradle bracket 68 to support the cradle 46 of the boat hull.

The fishing rod holder device 40 may further include a saddle 70 for engaging a portion of the reel 16 of the fishing rod assembly 10 when the rod 12 of the assembly 10 is positioned in the cradle 42. The saddle 70 may be formed on the cradle 42, and may be located toward the outboard end 45 of the cradle. The saddle 70 may be formed by a pair of saddle structures 72, 74, with each of the saddle structures being mounted on one of the side wall portions 56, 58 of the cradle wall 54.

In some embodiments, each of the saddle structures 72, 74 may comprise a saddle flange 76 mounted on the upper edge 60 of one of the side wall portions 56, 58 of the channel. The saddle flange 76 may be substantially arcuate in shape, and may open upwardly away from the bottom wall portion 64 of the cradle wall 54. Each saddle flange 76 may extend outwardly from the side wall portion on which it is mounted. The saddle flange 76 may be at least partially positioned in the semicircular saddle section 62 of the upper edge of the side wall. The saddle flange 76 may have a shape which is formed by a portion of a cylinder shape.

The fishing rod holder device 40 may also include a rod retaining structure 78 which is configured to removably secure the rod 12 of the fishing rod assembly 10 in the cradle 42. The rod retaining structure 78 may have a blocking condition (see the broken lines in FIG. 3) and a releasing condition (see the solid lines in FIG. 3). The blocking condition of the rod retaining structure 78 may be characterized by the retaining structure 78 blocking movement of a rod 12 positioned in the channel out of the channel, such as in a direction of movement perpendicular to the extent of the bottom wall portion 64 of the cradle wall. The releasing condition of the rod retaining structure 78 may be characterized by the retaining structure 78 permitting, or at least not significantly impeding, movement of a rod 12 positioned in the channel 46 out of the channel, such as in a movement direction perpendicular to the bottom wall portion. The rod retaining structure 78 may be mounted on the cradle 42, and may be mounted on the side wall portions 56, 58 of the cradle wall. The rod retraining structure 78 may be located toward the inboard end 44 of the cradle, and may be located between the saddle 70 and the inboard and.

In some embodiments, the rod retaining structure 78 may comprise securing fingers 80, 82 which are movable between a blocking position corresponding to the blocking condition of the rod retaining structure and a releasing position corresponding to the retaining condition of the rod retaining structure. The blocking position of the fingers 80, 82 may be characterized by each of the securing fingers extending inwardly from a respective side wall portion 56, 58 of the channel 46 toward the other securing finger so that a section of each of the securing fingers extends at least partially across the channel of the cradle to resist movement of the rod out of the channel of the cradle. The securing fingers may comprise a pair of securing fingers, although it is anticipated that fewer or more securing fingers may be utilized. Each of the securing fingers 80, 82 may extend approximately halfway across the channel 46. The releasing position of the securing fingers may be characterized by each of the securing fingers extending substantially parallel to, and in some cases alongside, the channel top opening 48 in order to permit movement of the rod 12 out of the channel 46. Each securing finger 80, 82 may be pivotally mounted on one of the side wall portions to permit the respective fingers to pivot between the blocking and releasing positions. Each of the securing fingers 80, 82 may be movable or pivotable in a movement plane such that movement of the securing fingers between the blocking and releasing positions occurs in the movement plane. The movement plane may be oriented at an angle a with respect to the edge plane defined by the upper edges 60 of the side wall portions 56, 58 of the cradle wall. In some embodiments, the angle a may be an oblique angle. The angle a may have a measurement in the range of between 0 degrees and approximately 90 degrees, and in some further embodiments the angle a may have a measurement of less than approximately 60 degrees. In embodiments, the angle a may have a measurement in the range of between approximately 30 degrees and approximately 45 degrees.

The rod retaining structure 78 may also further include biasing elements 84 which are configured to bias the securing fingers toward the blocking position, and may resist movement of the fingers out of the blocking position wall being capable of stopping movement of the fingers out of the blocking position. In some embodiments, the biasing elements 84 may comprise tension springs, with each tension spring being secured to the cradle 42 and a location on one of the securing fingers 80, 82.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A fishing rod holder device for holding a fishing rod assembly having a rod and a reel mounted on the rod, the holder device comprising:
    a cradle for cradling a portion of the fishing rod, the cradle being elongated with opposite ends, the cradle defining a channel for receiving the portion of the rod, the channel of the cradle being elongated along a channel axis, the cradle being configured to cradle the portion of the rod such that a length of the rod is oriented substantially parallel to the channel axis and a direction transverse to the length of the rod is substantially perpendicular to the channel axis, the cradle having a channel top opening extending from an inboard end opening at an inboard end of the cradle to an outboard end opening at an outboard end of the cradle;
    a saddle on the cradle and being configured to engage a portion of the reel of the fishing rod assembly when the rod of the fishing rod assembly is positioned in the cradle; and
    a rod retaining structure mounted on the cradle and configured to removably secure the rod of the fishing rod assembly in the cradle, the rod retaining structure having a blocking condition and a releasing condition, the blocking condition being characterized by the rod retaining structure blocking movement of a rod of the fishing rod assembly positioned in the channel out of the channel, the releasing condition being characterized by the rod retaining structure permitting movement of the rod of the fishing rod assembly positioned in the channel out of the channel, the rod retaining structure being biased toward the blocking condition, the rod retaining structure comprising:
        a pair of securing fingers movable between a blocking position corresponding to the blocking condition of the rod retaining structure and a releasing position corresponding to the releasing condition of the rod retaining structure, the blocking position being characterized by each of the securing fingers extending inwardly from the respective side wall portion of the channel toward the other securing finger so that a section of each of the securing fingers extends at least partially across the channel of the cradle to resist movement of the rod out of the channel of the cradle;
        wherein the securing fingers move from the blocking position to the releasing position in a movement plane, the movement plane extending outwardly from the channel top opening and toward the outboard end such that the movement plane is inclined toward the outboard end of the cradle and removal of the rod of the fishing rod assembly includes movement of the rod in a direction toward the inboard end of the cradle to cause the securing fingers to move in the movement plane from the blocking position toward the releasing position.

2. The device of claim 1 wherein the cradle comprises a cradle wall with two side wall portions on opposite sides of the channel; and
    wherein the saddle is formed by a pair of saddle structures, each of the saddle structures being mounted on one of the side wall portions of the cradle wall.

3. The device of claim 1 wherein the saddle is located toward one of the opposite ends of the cradle and the rod retaining structure is located toward another one of the opposite ends of the cradle.

4. The device of claim 2 wherein each of the saddle structures comprises a saddle flange mounted on an upper edge of one of the side wall portions of the channel.

5. The device of claim 4 wherein the reel of the fishing rod assembly includes a reel housing; and
    wherein the saddle flange is arcuate in shape to embrace a portion of the reel housing of the reel.

6. The device of claim 4 wherein the saddle flange extends outwardly from the side wall portion on which the saddle flange is mounted.

7. The device of claim 3 wherein each of the saddle flanges is at least partially positioned in a semicircular section of the upper edge of the respective side wall.

8. The device of claim 1 wherein each of the securing fingers extend approximately halfway across the channel.

9. The device of claim 1 wherein the cradle comprises a cradle wall with two side wall portions on opposite sides of the channel; and
    wherein each securing finger is pivotally mounted on one of the side wall portions to pivot between the blocking and releasing positions.

10. The apparatus of claim 1 additionally comprising:
    a base mount device configured to mount on the boat, the base mount device being elongated with an upper end and a lower end, the fishing rod holder device being mounted on the base mount device, the base mount device comprising:
        a lower mount member for mounting on the boat, the lower mount member being located toward the lower end of the base mount;
        an upper mount member located toward the upper end of the base mount; and
        a linking member linking the lower and upper mount members together, the linking member being connected to the lower mount member with a lower joint structure and being connected to the upper mount member with an upper joint structure; and
        wherein the cradle of the fishing rod holder device is mounted on the upper mount member of the base mount device;
    wherein each of the joint structures comprises a ball and socket joint structure.

11. The device of claim 1 wherein the rod retaining structure additionally comprises biasing elements configured to bias the securing fingers toward the blocking position and resist movement of the fingers out of the blocking position.

12. The device of claim 1 wherein the releasing position of the securing fingers is characterized by each of the securing fingers extending substantially parallel to and alongside a channel top opening of the cradle to permit movement of the rod out of the channel.

13. The device of claim 1 wherein each securing finger is pivotally mounted on opposite sides of the cradle to pivot between the blocking and releasing positions.

14. The device of claim 1 wherein the rod retaining structure is spaced from the inboard end and spaced from the outboard end in the direction of the channel axis, the rod retaining structure being located on the cradle toward the inboard end of the cradle between the saddle and the inboard end.

15. The device of claim 14 wherein the channel top opening is open from the rod retaining structure to the inboard end opening and the channel top opening is open from the rod retaining structure across the saddle to the outboard end opening.

* * * * *